(12) United States Patent
Reele et al.

(10) Patent No.: US 6,791,605 B1
(45) Date of Patent: Sep. 14, 2004

(54) IMAGE CAPTURE AND PRINTING DEVICE

(75) Inventors: Samuel Reele, Rochester, NY (US); Ronald Sagen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/307,315

(22) Filed: May 7, 1999

(51) Int. Cl.$^7$ .......................... H04N 5/225; H04N 9/04
(52) U.S. Cl. ................ 348/207.99; 348/373; 348/207.1
(58) Field of Search ................. 348/373, 375, 348/376, 207.99, 207.1, 207.11, 207.2, 211.8, 211.13, 211.14, 374; 355/40; 358/296, 474, 505

(56) References Cited

U.S. PATENT DOCUMENTS

| | | | |
|---|---|---|---|
| 4,262,301 A | 4/1981 | Erlichman | 358/6 |
| D285,564 S | 9/1986 | Bevilacqua et al. | D14/106 |
| 5,115,347 A | 5/1992 | Nilssen | 315/347 |
| 5,116,347 A | 5/1992 | Butler | 606/131 |
| 5,374,971 A * | 12/1994 | Clapp et al. | 348/376 |
| 5,416,610 A * | 5/1995 | Kikinis | 358/474 |
| 5,461,458 A | 10/1995 | Fuersich et al. | 355/77 |
| 5,550,938 A | 8/1996 | Hayakawa et al. | 382/313 |
| 5,555,105 A | 9/1996 | Shahir et al. | 358/473 |
| 5,715,234 A | 2/1998 | Stephenson et al. | 396/429 |
| 5,715,492 A | 2/1998 | Stephenson | 396/429 |
| 5,734,414 A * | 3/1998 | Nishimura et al. | 348/14.05 |
| 5,742,861 A | 4/1998 | Stephenson | 396/429 |
| 5,757,388 A | 5/1998 | Stephenson | 347/2 |
| 5,764,385 A * | 6/1998 | Ohyama | 358/498 |
| 5,802,413 A | 9/1998 | Stephenson | 396/429 |
| 5,933,191 A * | 8/1999 | Ariga et al. | 348/373 |
| 6,006,039 A * | 12/1999 | Steinberg et al. | 396/57 |
| 6,008,846 A * | 12/1999 | Uehara et al. | 348/373 |
| 6,183,933 B1 * | 2/2001 | Ishikawa et al. | 430/256 |

* cited by examiner

Primary Examiner—Wendy R. Garber
Assistant Examiner—Justin Misleh
(74) Attorney, Agent, or Firm—Norman Rushefsky

(57) ABSTRACT

An image producing device (10) including a digital camera an area image sensor (20) disposed at an image plane for receiving the image of a subject (21), and producing a digitized image thereof. A CPU (32a) is adapted to direct the output to a variety of storage mediums. A printer (30) is connected to the CPU (32a) for producing a hard copy (39) of the digital image as shown on an image display (38b). The integral digital camera adjustably; directable from 0° to 360° in a horizontal plane and selectively directed at a sheet display (54) or at a subject (21) for a portrait.

23 Claims, 3 Drawing Sheets

IMAGE CAPTURE AND PRINTING DEVICE

CROSS REFERENCE TO RELATED APPLICATIONS

Reference is made to commonly assigned U.S. Pat. No. 5,917,548 entitled "Electronic Camera Having a Printer for Providing Improved Hard Copy Images" by Dale F. McIntyre; and to commonly assigned U.S. Pat. No. 5,894,326 entitled "Electronic Camera Having a Printer" by Dale F. McIntyre, Stanley W. Stephenson, Mark M. Meyers, and John K. McBride.

FIELD OF THE INVENTION

The present novel invention relates to electronic digital cameras and, more particularly, to an electronic digital camera used in conjunction with a printer and central processing unit or computer which produces a digitized visual display and a hard copy of such digitized visual display including but not limited to text scanned using the electronic digital camera. The text can be downloaded from the internet or from computer memory or edited through a keyboard or a touch screen. This novel invention relates more specifically to a printer (typically a thermal printer, but not limited to thermal printers) wherein, the printer has the capability to input images/data through reading digitally stored image data and/or a digital image capture mechanism, display images for verification of real time image manipulation, as well as producing traditional output hard copy prints. In addition, the novel invention relates to image production devices which function as a self contained portrait studio with output features to provide a portrait of a subject via an immediate hard copy and alternatively, scan and store images and text presented in flexible sheet form.

BACKGROUND OF THE INVENTION

It is known in the prior art to provide an electronic camera that uses an area image sensor. Digital images produced from the image sensor are stored in memory and these images can be shown on a display so that the user can determine which image should be stored for use in producing hard copy images. Typically, these images can be stored in a magnetic disk or a compact PCMCIA Flash RAM Card.

In U.S. Pat. No. 4,262,301 an electronic camera is disclosed which includes a display device. The camera also includes a digital-to-analog converter that sends signals to the display. Also, the digital-to-analog converter selectively sends these images to a magnetic tape for storage. Images on the magnetic tape can then be produced as a hard copy by a printer that is provided as part of the camera. One problem with the approach in U.S. Pat. No. 4,262,301 is that a print must be made in order for a user to determine whether it is satisfactory. Another problem is that it does not offer or provide as an alternative, a means for using the camera as a digital scanner and copier for text or images on sheets.

Typically, today's image copy/print systems such as the Kodak™ Image Magic Print System™, contains a bundling of multiple individual products. Each product performs unique discrete functions, and all products are tied together through custom software, custom firmware and custom electronic hardware. These multiple products and functions include: (1) the scanning of an image on negatives or print media by using a discrete scanner, (2) viewing the image-typically through the use of a discrete monitor (for today's state-of-the art), (3) processing the image by using a discrete processor or personal computer, and (4) editing the image typically via a discrete keyboard, image mouse, or touch screen for today's state-of-the art.

Less comprehensive approaches to the problem of combining multiple discrete product functions have been previously considered. For example, there is Hongoh et. al, U.S. Pat. No. 5,115,347 wherein a laptop computer has an internal image scanner and a means to provide facsimile transmission including internal signal compatibility and a mechanically adaptive interface. Bevilacqua, et. al, U.S. Des. Pat. No. 285,564, discloses a discrete scanner and monitor that are combined. Shahir, et. al., U.S. Pat. No. 5,555,105 discloses a handheld business card image copier that is combined with a scanner, keypad for identification data, and a display. Hayakawa et. al, U.S. Pat. No. 5,550,938 discloses a scanner, display and editor that are integrated.

In addition, the concept and reduction to practice of alternate scanning means wherein the scanned data is digitized and easily imported into a computer architecture is presented in U.S. Pat. No. 5,416,610 issued to Kikinis wherein a photovoltaic film is utilized to allow a computer to be used as a scanner.

More recently, on Feb. 3, 1998, U.S. Pat. No. 5,715,492 issued to Stephenson for an electronic camera and associated printer with a light shutter wherein photosensitive sheets are employed; and, on the same date U.S. Pat. No. 5,715,234 also issued to Stephenson for an electronic camera and associated printer which uses a display image and captures the image on a photosensitive sheet. On Apr. 21, 1998, U.S. Pat. No. 5,742,861 also issued to Stephenson for an electronic camera and associated printer which uses an image display and captures the image on a photosensitive sheet and other improvements. On May 26, 1998, U.S. Pat. No. 5,757,388 also issued to Stephenson for an electronic camera and integral ink jet printer which uses an image display and electronically captures and stores the image. On Sep. 1, 1998, U.S. Pat. No. 5,802,413 issued to Stephenson for a printer adapted to receive an electronic camera which uses an image display and electronically captures and stores a digital image.

The novel invention resolves the problem of bundling these discrete devices together with a computer control unit or CPU to provide multi-tasking such as digital scanning, digital modifications, and subsequent monitor viewing of changes inputted before printing of images and text, or alternatively, to provide a portrait of a subject or image using the same electronic digital camera in a cost effective manner when compared to cost of a manufactured unit integrating the functions of scanning, digitizing, digitally editing, previewing edited versions of images prior to printing, printing digitized images, making multiple copies of digitized images, downloading digitized images to the Internet or from the Internet, copying digitized images to floppy disks, optical disks, other digital cameras, CD-ROMs, or to another computer.

SUMMARY OF THE INVENTION

An object of this invention is to provide a novel combination of devices in a compact integrated unit or device whereby attaching a digital camera such that it can rotate from zero to 360 degrees in a plane, the integrated devices acquires the multi-tasking capacity to function as a scanner, copier, editing and/or preview station, portrait maker and hard copy output unit.

This object is achieved by a novel integration of a sheet feeder and novel sheet display unit, vertically oriented for example, with a detachably mounted digital camera which is rotably mounted in a plane orthogonal to the sheet display unit. Thus, the novel invention describes how one can replace the scanner (input hardware) with a removable and position altering digital camera and incorporate that camera feature into one integral, multi-functional single printer device made up of an integrally combined scanner, monitor, printer, keyboard and computer processor unit or CPU.

One of the most outstanding advantages of the present invention is that the use of an attachable digital electronic camera is expanded by combining same with a novel combination device comprising a sheet feeder which displays each sheet in a vertical position such that its image is viewable and captured by the digital electronic camera, digitally displayed, and printed and the same camera is selectively used to prepare digitally adjustable life size portraits with the use of an integrated computer or CPU and keypad control panel by mounting the camera on an integral rotatable mounting.

DETAILED DESCRIPTION OF THE INVENTION

Figure 1:
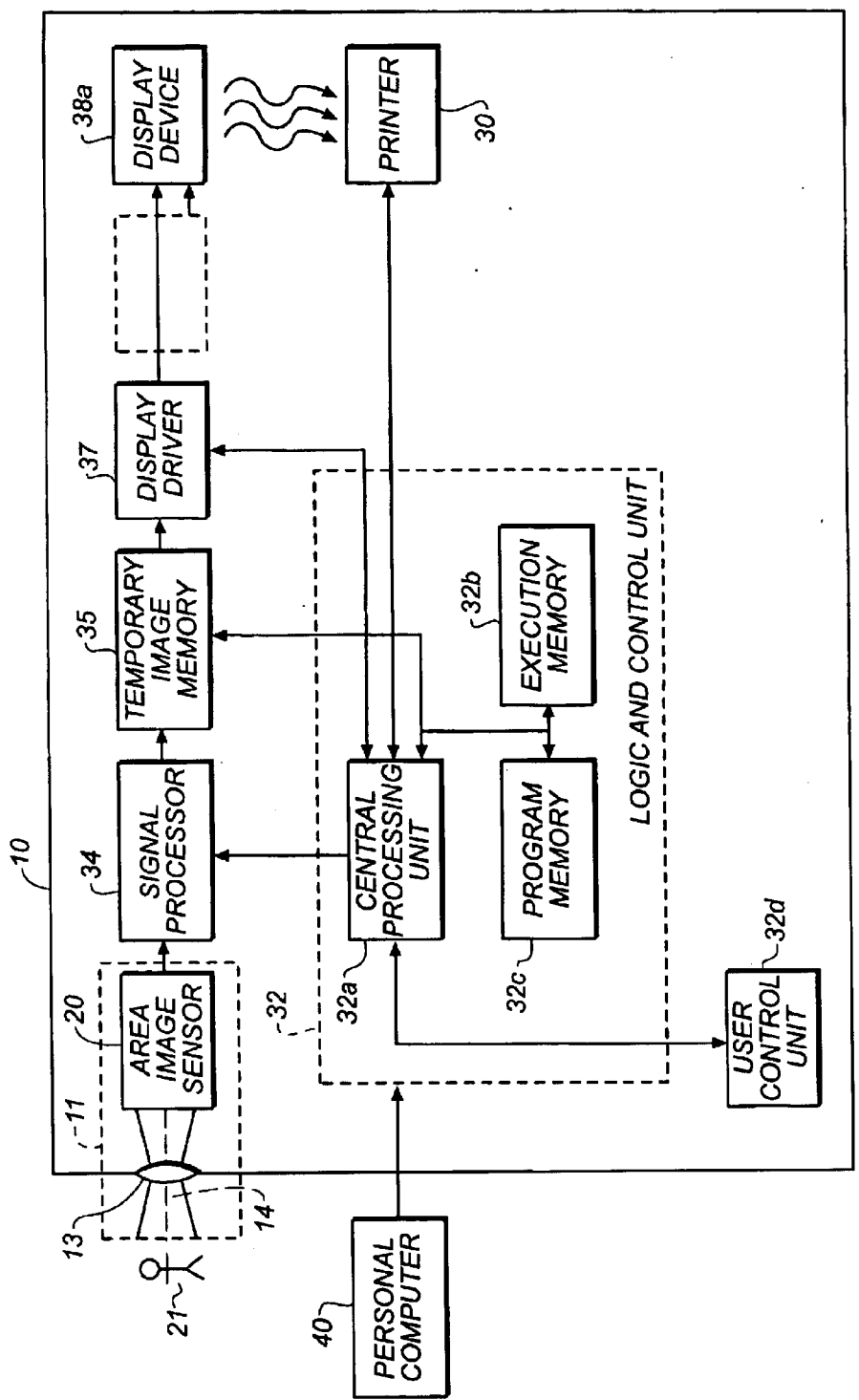
FIG. 1 is a block diagram of an integral digital camera integrated into a novel multi-task image producing device to provide both scanning images on sheets or alternatively a portrait in accordance with the present disclosure.
Figure 3:
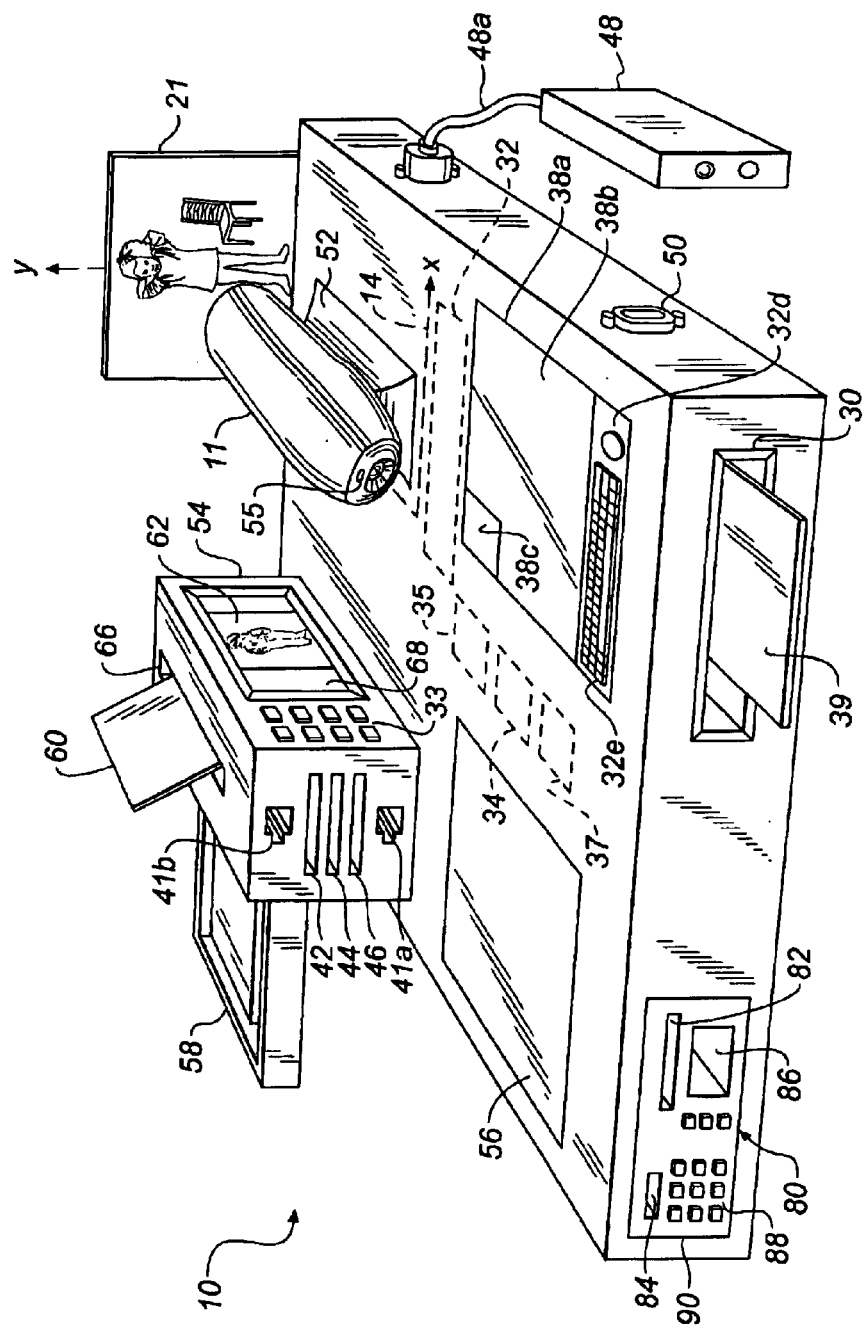

In FIG. 1, a block diagram is shown of operable portions of an image producing device 10 the preferred embodiment of which is shown in FIG. 3. An integral part of the device 10 is a first digital camera 11 (see FIG. 3) made of a lens or image focusing means 13 and an area image sensor 20. As shown in FIG. 1, a first subject 21 is positioned in front of the imaging focusing means 13. To produce an image, the image producing device 10 utilizes the digital camera 11 which includes the area image sensor 20 arranged to coincide with the longitudinal axis 14 of the image focusing means 13. A printer 30 is utilized as further defined below. An image of the first subject 21 is focused on the area image sensor 20. Area image sensor 20 is a full frame charge coupled device (CCD), or Cmos sensor, as examples, or alternatively, it is an interline device with, for example, photodiode pixels which are adapted to deliver charge to interline CCDs.

Conventional electronic circuitry (not shown) is associated with the image sensor 20. After the area image sensor 20 receives light representative of the image of the subject 21, the circuitry sets up, acquires, and transfers electronic signals from the area image sensor 20. Such electronics are well known in the art and their description is omitted for clarity of discussion.

Still referring to FIG. 1, Logic and control unit 32 causes the area image sensor 20 to transfer electronic signals to an electrical signal processor 34. The signal processor 34 will be understood to include that circuitry necessary for converting signals from the area image sensor 20 to electrical signals and includes gain control and analog-to-digital circuitry well known in the art. The logic and control unit 32 can, of course, include a microprocessor as is well known to those skilled in the art. The signal processor 34 delivers, under the control of logic and control unit 32, signals into a storage location in a temporary image memory 35 or buffer, which can be either a floppy disk, optical CD or semiconductor memory under the control of logic and control unit 32. These signals, when stored, represent a digital image of the subject 21. The logic and control unit 32 causes the digital signals in memory to be applied to a display driver 37 that, in turn, applies signals to a display device 38a or an image display 38b (see FIGS. 2 and 3). The display driver 37 will be understood to include a digital-to-analog converter and formatting control which is appropriate for the type of display device 38a or image display 38b (see FIGS. 2 and 3) as well known in the art. The display device 38a and the image display 38b (see FIGS. 2 and 3) may be embodied as a liquid crystal display. As well understood to those skilled in the art, the logical and control unit 32 provides refresh signals to the display device 38a and image display 38b (see FIGS. 2 and 3). In accordance with the present invention, when a hard copy 39 (see FIG. 3) is desired, a user signals to logic and control unit 32 to transfer or replicate (as illustrated via dotted lines and solid arrow) the data stream used for the digitized image shown on the display device 38a or image display 38b to the printer 30 and to activate the printer 30. As further described, it will be understood that the logic and control unit 32 can also deliver the digital image of the subject 21 to any of a variety of integral ports for transfer of the digital information representing the first subject 21 to a wide variety of external devices: for example, via the portal 41a (see FIG. 3) to a personal computer 40; or to a memory card reading and writing device 42 (see FIG. 3), a compact disk reading and writing device 44 (see FIG. 3), a digital video disk reading and writing device 46 (see FIG. 3), or to a second video camera 48 (see FIG. 3) via a tether 48a (see FIG. 3), and/or to the Internet via an access and transfer enabling portal 50 (see FIG. 3)

The logic and control unit 32 is shown to include a central processing unit 32a that may be provided by a microprocessor chip. Execution memory 32b is also shown and is typically provided by random access memory (RAM). This memory is used for computation during image adjustment of the various parameters. As is well known to those in this art, the program memory 32c (typically ROM) can include conventional programs for image rotation, contrast and brightness adjustment, and also changing the color content by using state-of-the-art color management programs ubiquitous in this art. A user control unit 32d, including a control keypad 32e (see FIGS. 2 and 3), permits a user to select the appropriate program by directly inputting interrupt signals into the central processing unit 32a.

Many of such image processing algorithms have been implemented as commercially available packages (which perform all functions on the highest resolution data. See, for example, U.S. Pat. No. 5,218,455, the full text and drawings of which are incorporated herein by reference. These encoding schemes are optimized for performance and are commercially available as libraries of subroutines, such as MathPAK 87 (a trademark of Precision Plus Software). Additional image processing algorithms that may be used are included in the following commercially available packages: Photoshop™ (trademark of Adobe Systems Incorporated), Color Studio™ (trademark of Letraset), and PhotoMac™ (trademark of Avalon Development Group). For examples of color management systems including color transforms for changing color content such as contrast, brightness, and gamut, see U.S. Pat. Nos. 5,313,611 and 5,432,906, the text and drawings of which are both incorporated herein by reference.

In FIG. 3 the printer 30 is shown as an integral part of the device 10 located beneath the display device 38a. The display device 38a and the image display 38b function as a PIP (picture in picture) display 38c. Both are an integral part of the device 10 and therefore also maintained in a fixed permanent position. A transformer (not shown) is connected to a standard electrical outlet (not shown) to provide power for the device 10, for example. A battery source is used to power the first camera 11 and the second camera 48, for example. When a user determines that an image is to be printed, the central processing unit 32a (shown in FIG. 1) of the logic and control unit 32, retrieves the image from the temporary storage and creates a mirrored image of the previously displayed image and reapplies that to the display device 38a or the image display 38b and uses it for printing. It will be understood that the program memory 32c (shown in FIG. 1) of the logic and control unit 32, includes the necessary program for providing this function. This type of program is well known in the printing art. The display device 38a and the image display 38b can be adjusted as well known to those skilled in the art to create an image of correct density and color balance before printing the hard copy 39.

Figure 2:
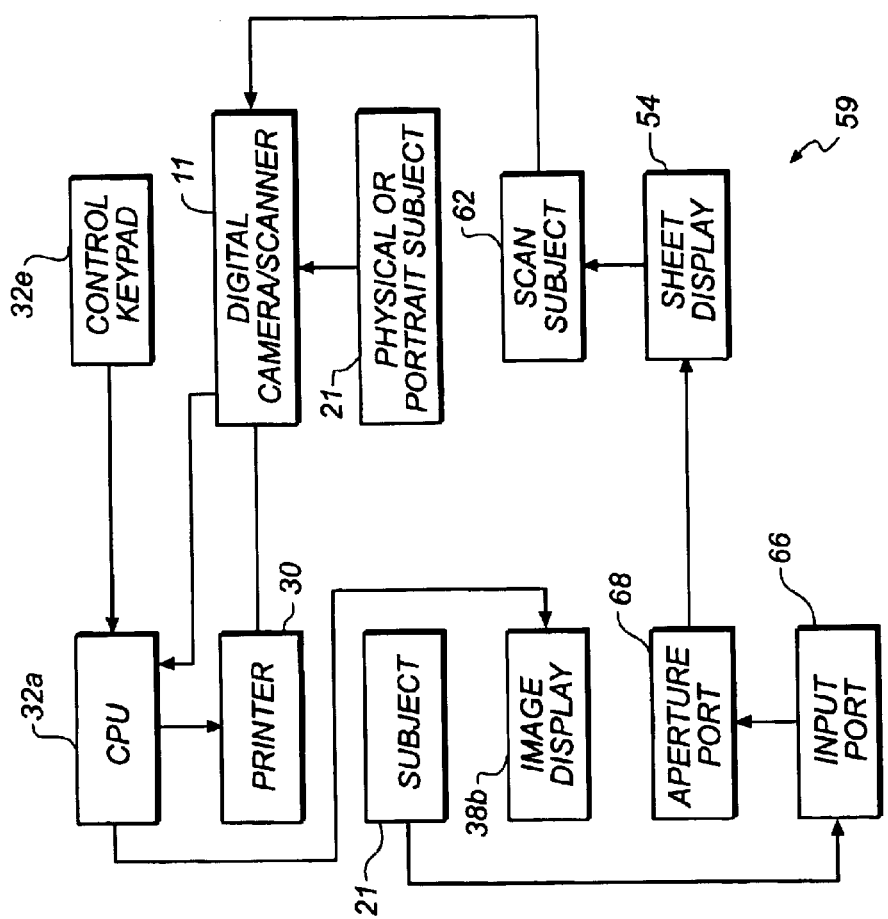
FIG. 2 is a flow chart which illustrates the operation of the novel image producing device according to the invention; and, FIG. 3 is a perspective view of the novel multi-task image-producing device adapted with a credit card and coin payment unit.

A comprehensive view of the novel operational capabilities offered by the novel device 10 shown in FIG. 3 is best understood by reference to a flow chart 59 shown in FIG. 2. One object of this novel invention is to embody a new scanning capture apparatus made up of the first digital camera 11 mounted on a swivel mount 52 (see FIG. 3,) which works in conjunction with an integral fixed vertical sheet display unit 54 shown in FIGS. 2 and 3. The utility created is a multi-function product or device 10, namely: an integral sheet feeder 58 (see FIG. 3) for sheets 60 (see FIG. 3), sheet display 54 for vertically displaying the actual sheet 60, and printer 30 which function cooperatively to provide scanner, copier, and portrait studio functions from the device 10.

In FIG. 2 the printer 30 is shown connected to the CPU 32a. The printer 30 may be either an inkjet, thermal, laser, or any other type of printer. The CPU 32a controls the functions of the printer. The CPU 32a is either the equivalent of the internal hardware and an operating system of a state-of-the art personal computer 40 (see FIG. 1) or preferably a state-of-the-graphics printer and display controller incorporating both RAM and ROM memory modules. Referring to FIG. 3, the device 10 is controlled and operated from a touch screen monitor and/or the control keypad 32e which may be a computer keyboard, for example, integrated into and a part of the device 10 as shown in FIG. 3. The sheet display 54 has a sheet display keypad 33 for adjustment of the sheet 60 and controlling the operation of the sheet display 54. There is shown on the sheet 60 a second subject hereinafter referred to as a scan subject 62 displayed in the sheet display 54. The sheet 60 may be feed through the bottom or a side (not shown) or an input port 66 located on top of the device 10. A subject 62 submitted for copying and printing is also fed through the input port 66. The CPU 32a (see FIGS. 1 and 2) controls the operation of the digital camera/scanner 11 and transfers the image created by the digital camera 11 and displays this digitized image on the image display 38b, for example.

Again referring to FIGS. 2 and 3, to make a hard copy 39 (FIG. 3) or portrait of a physical or portrait subject 21, after actuating the device 10 (FIG. 3) via the control keypad 32e the portrait subject 21 is positioned in a substantially vertical plane "y" transverse to the linear axis 14 (FIG. 3) of the digital camera 11, i.e. the subject 21 stands or sits in front of the digital camera 11 and allows a standard automatic focusing mechanism to operate. The CPU 32a (FIG. 2), as a digital data stream, retrieves a digitized image of a portrait of the subject 21 from the digital camera 11. The CPU 32a (FIG. 2) directs the data stream as is or in an altered format to the image display 38b where a user or operator (not shown) observes the image. If the image shown on the image display 32a (FIG. 2) is satisfactory to the user or operator, the user or operator issues a command via the control keypad 32e directing the printer 30 to produce a hard copy 39 (FIG. 3) of the digitized image shown on the image display 38b. For this portrait operation, the digital camera 11 has its longitudinal axis 14 (FIG. 3) and lens pointed at the portrait subject 21 oriented in a vertical plane "y". The digital camera 11 is pointed clear of the field of view occupied by a sheet display 54. An indicator light 55 (FIG. 3) shows when the camera 11 is turned on. An area for arranging paper or workspace 56 (FIG. 3) is provided.

In FIGS. 2 and 3, there is a shown the sheet display 54 and attached thereto is an optional sheet feeder 58 (FIG. 3). The sheet display 54 and its housing are an integral part of the device 10 (FIG. 3). Thus, to provide the device 10 (FIG. 3) with the capacity to operate both as a self-contained portrait studio and as a copier and scanner employing the efficiency of using only the first digital camera 11, namely, a digital camera and functional scanner combination, the digital camera 11 is rotably attached to mount 52 (FIG. 3). The attachment mechanism is a standard threaded aperture at the bottom of the digital camera 11 adapted to receive a revolvable threaded bolt (not illustrated) located at the top of the mount 52 (FIG. 3). Thus, the digital camera 11 is enabled to rotate from zero to 360 degrees in a horizontal plane "x" such that the longitudinal axis of the digital camera 11 is orthogonal to the camera lens or image focusing means 13 (see FIG. 1). The focal plane of the first digital camera 11 is orthogonal the vertically oriented sheet display 54.

Referring to FIG. 3, a scanning feature is enabled when a sheet 60 of flexible material, for example, paper is inserted in the input port 66 by either a sheet feeder 58 or manually. An input port 66 connects to an aperture port 68. The aperture port 68 is a mechanical frame which displays the sheet 60 is a vertical position such that when the digital camera 11 is directed at the frame it can scan an image 62 of whatever is displayed on the sheet 60, i.e., a scan subject. A stream of digital data produced by the digital camera 11 is received by the CPU 32a (shown in FIGS. 1 and 2) and processed and either stored in a temporary image memory 35 (in ghost, also depicted schematically in FIG. 1) or buffer memory and/or directed to another storage or output portal 41a, the printer 30, and/or the image display 38b.

When the device 10 is operating in a copier mode the scan subject 62 is printed immediately. When the device 10 is operating as scanner wherein the scan subject 62 is to be stored in compact medium, for example, a floppy disk using a compact disk reading and writing device 44, then the data stream representing the scan subject 62 is written to the compact disk reading and writing device 44.

Alternatively, again referring to FIGS. 2 and 3, the scan subject 62 can be published on an intranet or the Internet via an Internet portal 41b, i.e. a phone jack interconnect, shown in FIG. 3 integrated on the sheet display 54 of the device 10. Similarly, connected to the CPU 32a (shown in FIGS. 1 and 2) in parallel for this purpose and integrated on the sheet display 54 are a memory card reading and writing device 42, an optical or digital video disk reader and writer 46, and a CD-ROM or compact disk reader and writer 44. Also text and/or images can be downloaded from the internet, viewed, edited and printed by device 10 (FIG. 3) via internet portal 41.

Also shown in FIG. 3 is a second digital camera 48 connected to the device 10 via a tether 48*a*. The logic control unit 32 is able to transfer data representing images either to or from the second digital camera 48*a*. Hence, the device 10 presents a multi-task image producing apparatus adapted with a payment unit 80 having a credit card slot 82 and coin or money insert slot 84. Additionally, there is a change return cavity 86 and auxiliary selection key array 88. This enables the device 10 to provide a public "phone booth type" facility where a user can use a coin and/or credit card payment and actuation device 90 integrated into the device 10 to obtain an immediate hard copy 39 or print of a digital image from a personal digital camera, i.e. the second digital camera 48 connected via the tether 48*a*, or obtain portraits and/or multiple hard output copies. Two different digitized images from either the first digital camera 11 or from a video camera, such as second digital camera 48, are previewable via the PIP window 38*c* incorporated in the display device 38*a* and driven via the CPU 32*a* of logic control unit 32 equipped to provide the optional PIP capability.

The invention has been described in detail with particular reference to a certain preferred embodiment thereof, but it will be understood that variations and modifications can be effected within the spirit and scope of the novel invention and equivalents thereof.

PARTS LIST 10 image producing device
11 first digital camera
13 image focusing means
14 longitudinal axis
20 area image sensor
21 first subject
30 printer
32 logic and control unit
32*a* central processing unit
32*b* execution memory
32*c* program memory
32*d* user control unit
32*e* control keypad
33 sheet display keypad
34 electrical signal processor
35 temporary image memory
37 display driver
38*a* display device
38*b* image display
38*c* PIP window
39 hard copy
40 personal computer (PC)
41*a* portal for PC (USB of SCSI)
41*b* Internet portal
42 memory card reading and writing device
44 compact disk reading and writing device
46 digital video disk reading and writing device
48 second video camera
48*a* tether
50 access and transfer enabling portal
52 mount
54 sheet display
55 indicator light
56 workspace
57 sheet feeder
59 flow chart
60 sheet
62 second subject
62 scan subject (i.e., second subject) input port
67 aperture port
80 payment unit
82 credit card slot
84 coin or money insert slot
86 change return cavity
88 auxiliary selection key array
90 actuation device

What is claimed is:

1. An image producing device comprising:
    a) a lens for focusing an image of a first subject at an image plane while the first subject is oriented in a vertical direction and the lens faces the first subject that is spaced from the lens in a first horizontal direction, the first subject being a portrait subject;
    b) an area image sensor disposed at the image plane for capturing the image of the first subject and producing digital image information representing the first subject, said area image sensor and said lens being supported to be rotatable about a vertical axis so that the lens is selectively pointed so as to be spaced in a second horizontal direction from a second subject for allowing capturing of an image by the image sensor of the second subject that is vertically supported and producing digital image information representing the second subject and wherein the second subject is a document that is oriented vertically;
    c) a storage device for selectively storing digital image information of the first or second subjects, said storage device being coupled to the area image sensor;
    d) a display device for selectively displaying a digital image representation of the first subject and a digital image representation of the second subject, said display device being coupled to the storage device;
    e) a printer for selectively producing a hard copy output of each of the first subject and the second subject as selectively shown by the display device;
    f) a central processing unit for controlling and adjusting the output to said printer and to said display device, said central processing unit connected to said storage device, said central processing unit being capable of controlling and adjusting the respective outputs of the first and second subjects to said printer and to said display device; and
    g) a document support device for supporting a document comprising the second subject in a vertical orientation.

2. The image producing device according to claim 1 wherein the document support device comprises:
    a) an input port adapted for receiving said second subject, said second subject comprising at least one flexible sheet, and
    b) an aperture port connected to said input port and adapted to provide a sequential display of each flexible sheet comprising said second subject.

3. The image producing device according to claim 1 wherein said document support device includes a feeder for feeding documents into a vertical orientation.

4. The image producing device according to claim 1 further comprising a memory card reading and writing device.

5. The image producing device according to claim 1 further comprising a compact disc reading and writing.

6. The image producing device according to claim 1 further comprising a digital video disc optical reading and writing device.

7. The image producing device according to claim 1 further comprising a floppy card reading and writing device.

8. The image producing device according to claim 1 further comprising a download connector port adapted to selectively couple for downloading a digital image stored by the storage device.

9. The image producing device of claim 1 wherein said area image sensor is a removable first digital camera adapted to be positioned to provide a portrait of the first subject and wherein said first digital camera is further adapted to be repositioned to scan said second subject.

10. The image producing device according to claim 1 further comprising a connector port for a second digital camera, said connector port being adapted for selectively interfacing said second digital camera to said printer.

11. The image producing device according to claim 9 wherein said first digital camera when connected to said printer comprises a copy machine.

12. The image producing device according to claim 1 an Internet connection portal is provided for connection to the printer to provide copying of information from the Internet.

13. The image producing device according to claim 1 wherein, the image producing device comprises a portrait studio for providing a portrait wherein the display device is adapted to provide a full size image of the size of the image to be printed and the printer is adapted to print said full size image.

14. An image producing device comprising:
   a) integral focusing means for focusing an image of a first subject at an image plane;
   b) an integral area image sensor disposed at the image plane for receiving the image of the first subject and producing a digital image representing the first subject;
   c) integral storage means coupled to the area image sensor for storing the digital image of the subject;
   d) an integral central processing unit connected to said storage means and an integral control keypad means adapted to cooperate with the central processing unit for controlling and adjusting the digital image of said subject to an integral printer and to an integral display;
   e) said integral display for displaying the digital image of the first subject; and
   f) said integral printer for selectively producing a hard copy output of the first subject as shown by the display; and
   g) a support for supporting the focusing means for rotation about a vertical axis; and
   h) a document support for supporting a document in a vertical plane for capturing an image of the document by said image sensor means while the document is supported by said document support in said vertical plane.

15. The device according to claim 14 wherein the integral area image sensor is a digital camera.

16. The device according to claim 15 wherein the integral display is connected to the integral storage means.

17. The device according to claim 14 wherein the integral printer is an inkjet printer.

18. The device according to claim 14 wherein the integral printer is a thermal printer.

19. The device according to claim 14 wherein the integral printer is a laser printer.

20. The device according to claim 14 wherein the integral printer is a printer adapted for printing actual size portraits of the size of the image displayed on the display.

21. A method for producing images, the method comprising:
   providing a digital camera supported for rotation about a vertical axis;
   providing a document support for supporting a document in a vertical orientation;
   operating the digital camera to record an image of a portrait subject in a first orientation of the digital camera about the vertical axis;
   rotating the digital camera about the vertical axis to a second orientation of the digital camera about the vertical axis;
   operating the digital camera after rotation to the second orientation to record an image of the document while supported in the vertical orientation; and
   printing selectively images recorded by the digital camera.

22. The method of claim 21 and including a document feeder for feeding a document into a vertical orientation to support in the vertical orientation for recording of an image thereof.

23. The method of claim 21 and including storing an image of the subject recorded by the digital camera and downloading the image to a second digital camera.

* * * * *